United States Patent
Lin et al.

(10) Patent No.: US 9,904,423 B2
(45) Date of Patent: Feb. 27, 2018

(54) TOUCH ELECTRODE LAYER

(71) Applicant: Au Optronics Corporation, Hsinchu (TW)

(72) Inventors: Yi-Hsin Lin, New Taipei (TW); Teng-Fu Tung, Hsinchu (TW); Yu-Jing Chen, New Taipei (TW); Chun-Ku Kuo, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 168 days.

(21) Appl. No.: 14/807,873

(22) Filed: Jul. 23, 2015

(65) Prior Publication Data

US 2016/0209952 A1 Jul. 21, 2016

(30) Foreign Application Priority Data

Jan. 16, 2015 (TW) .............................. 104101490 A

(51) Int. Cl.
*G06F 3/041* (2006.01)
*G06F 3/044* (2006.01)

(52) U.S. Cl.
CPC .... *G06F 3/044* (2013.01); *G06F 2203/04111* (2013.01)

(58) Field of Classification Search
CPC .................. G06F 3/0412; G06F 3/044; G06F 2203/04111
See application file for complete search history.

(56) References Cited

U.S. PATENT DOCUMENTS

| 8,947,370 | B2* | 2/2015 | An | G06F 3/044 178/18.01 |
| 2008/0309635 | A1* | 12/2008 | Matsuo | G06F 3/044 345/173 |
| 2011/0025639 | A1* | 2/2011 | Trend | G06F 3/044 345/174 |
| 2012/0313873 | A1* | 12/2012 | Bright | G06F 3/044 345/173 |
| 2013/0168138 | A1* | 7/2013 | Yamazaki | H05K 1/0296 174/253 |

(Continued)

FOREIGN PATENT DOCUMENTS

| CN | 103279251 | 9/2013 |
| CN | 203950288 | 11/2014 |

(Continued)

*Primary Examiner* — Yuzhen Shen
(74) *Attorney, Agent, or Firm* — JCIPRNET

(57) ABSTRACT

A touch electrode layer includes a plurality of touch electrodes, a plurality of first bridges, a plurality of second bridges, and an insulation layer disposed between the first bridges and the second bridges. The touch electrodes are arranged in rows and columns. The first bridges electrically connect the touch electrodes located in the same row to form a plurality of first touch series. The second bridges electrically connect the touch electrodes located in the same column to form a plurality of second touch series. Each touch electrode includes a top electrode pattern and a bottom electrode pattern stacked with each other. A normal projection in a XY plane of an edge of a top surface of the top electrode pattern and a normal projection in the XY plane of an edge of a top surface of the bottom electrode pattern are not completely overlapped.

16 Claims, 10 Drawing Sheets

(56) References Cited

U.S. PATENT DOCUMENTS

| | | | |
|---|---|---|---|
| 2013/0207930 A1* | 8/2013 | Lin | G06F 3/044 345/174 |
| 2014/0027262 A1* | 1/2014 | Kim | H03K 17/9618 200/600 |
| 2014/0225864 A1* | 8/2014 | Chang | G06F 3/044 345/174 |
| 2015/0015813 A1* | 1/2015 | Yoshinari | C07D 251/24 349/12 |
| 2015/0220179 A1* | 8/2015 | Kimura | G06F 3/044 345/174 |
| 2015/0234500 A1* | 8/2015 | Ishino | G06F 3/044 345/174 |
| 2015/0309637 A1* | 10/2015 | Sakuishi | G06F 3/0412 345/174 |
| 2016/0117012 A1* | 4/2016 | Wang | G06F 3/044 345/174 |
| 2016/0117031 A1* | 4/2016 | Han | G06F 3/0412 345/174 |

FOREIGN PATENT DOCUMENTS

| | | |
|---|---|---|
| JP | 2008310551 | 12/2008 |
| TW | M366714 | 10/2009 |
| TW | 201310295 | 3/2013 |
| TW | 201441900 | 11/2014 |
| TW | 201447685 | 12/2014 |

\* cited by examiner

TOUCH ELECTRODE LAYER

CROSS-REFERENCE TO RELATED APPLICATION

This application claims the priority benefit of Taiwan application serial no. 104101490, filed on Jan. 16, 2015. The entirety of the above-mentioned patent application is hereby incorporated by reference herein and made a part of this specification.

FIELD OF THE INVENTION

The invention relates to an electronic device layer, and more particularly, to a touch electrode layer.

DESCRIPTION OF RELATED ART

As information technology, wireless mobile communication and information appliances have been rapidly developed and applied, to achieve more convenience, more compact, slimmer and more user-friendly designs, various information products have changed from using conventional input devices such as key boards or mice to using touch panels. The touch panel includes a substrate and a touch electrode layer which is disposed on the substrate. The touch electrode layer includes a plurality of touch electrodes, a plurality of first bridges, a plurality of second bridges, and an insulation layer which is disposed between the first bridges and the second bridges. The touch electrodes are arranged in rows and columns. The first bridges electrically connect the touch electrodes which are located in the same row to form a plurality of first touch series. The second bridges electrically connect the touch electrodes which are located in the same column to form a plurality of second touch series.

When a user desires a touch region with a large area, more quantities for each of the first and second touch series are required, and impedance of each of the first and second touch series increases. Each of the first and second touch series having high impedance increases loads of the touch panel, which is adverse to the enhancement of electrical performance of the touch panel. In order to overcome the above issue, some increase a thickness of each of the touch electrodes (i.e., enlarge a cross-sectional area of each of the touch electrodes; resistance value of each of the touch electrodes is decreased), so as to reduce impedance of each of the first and second touch series. However, when the thickness of each of the touch electrodes is increased, transmittance differences between a region of the touch electrode and other regions are also increased accordingly, such that edges of the touch electrode may be prone to be perceived by a user and visual effects of the touch panel is adversely affected.

SUMMARY OF THE INVENTION

The invention provides a touch electrode layer for improving visual effects of conventional touch panels.

The invention provides a touch electrode layer, which includes a plurality of touch electrodes, a plurality of first bridges, a plurality of second bridges, and an insulation layer disposed between the first bridges and the second bridges. The touch electrodes are arranged in rows and columns to form an array. The first bridges electrically connect the touch electrodes which are located in the same row to form a plurality of first touch series. The second bridges electrically connect the touch electrodes which are located in the same column to form a plurality of second touch series. Each of the touch electrodes includes a top electrode pattern and a bottom electrode pattern which are stacked with each other. A normal projection in a XY plane of an edge of a top surface of the top electrode pattern and a normal projection in the XY plane of an edge of a top surface of the bottom electrode pattern are not completely overlapped.

In view of the above, a touch sensing layer in an embodiment of the invention includes a plurality of touch electrodes. Each of the touch electrodes includes a top electrode pattern and a bottom electrode pattern which are stacked with each other and electrically connected to each other, and a normal projection in a XY plane of an edge of a top surface of the top electrode pattern and a normal projection in the XY plane of an edge of a top surface of the bottom electrode pattern are not completely overlapped. Therefore, the touch sensing layer of the invention has an advantage that an outer profile of the touch electrodes are not prone to be perceived on a premise of maintaining a lower impedance, so that a touch panel employed with the touch electrode layer has excellent electric characteristics and fine visual effects.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
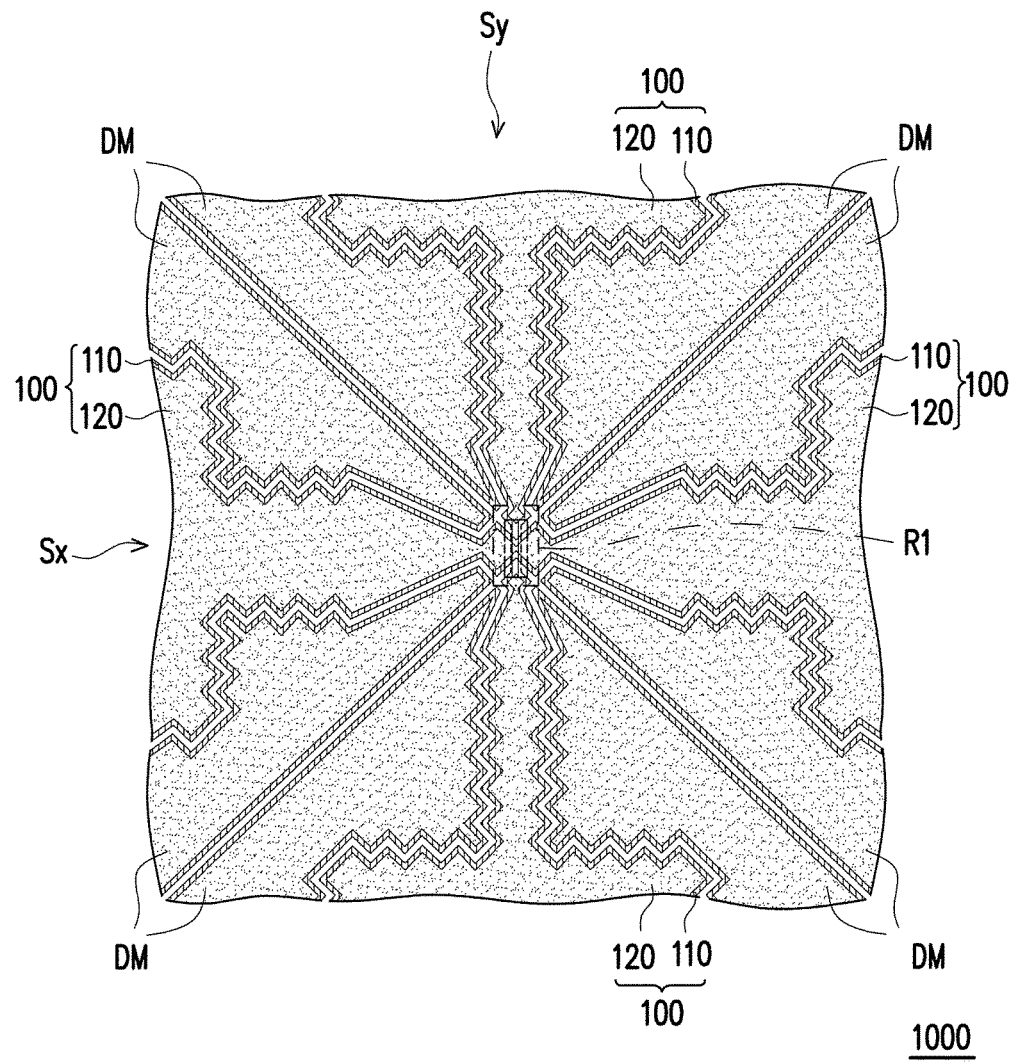
FIG. 1 is a schematic top view illustrating a touch electrode layer according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
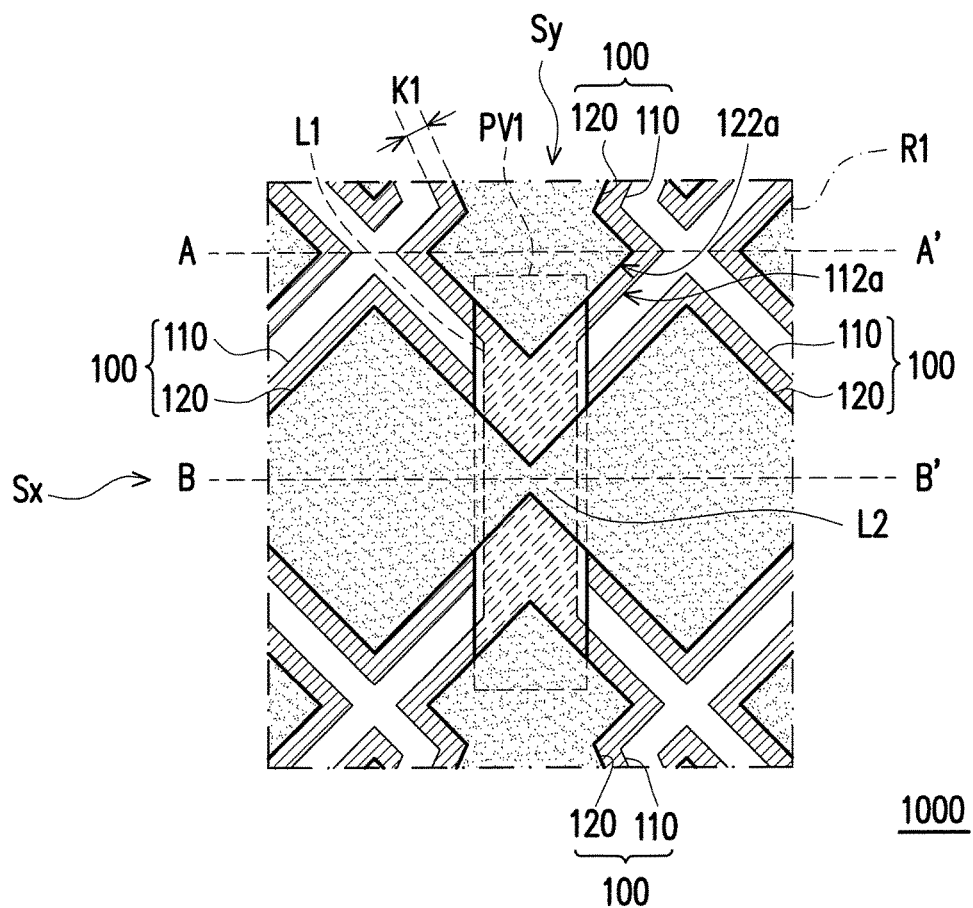
FIG. 2 is an enlarged schematic view illustrating a region R1 of the touch electrode layer depicted in FIG. 1.
Figure 3:
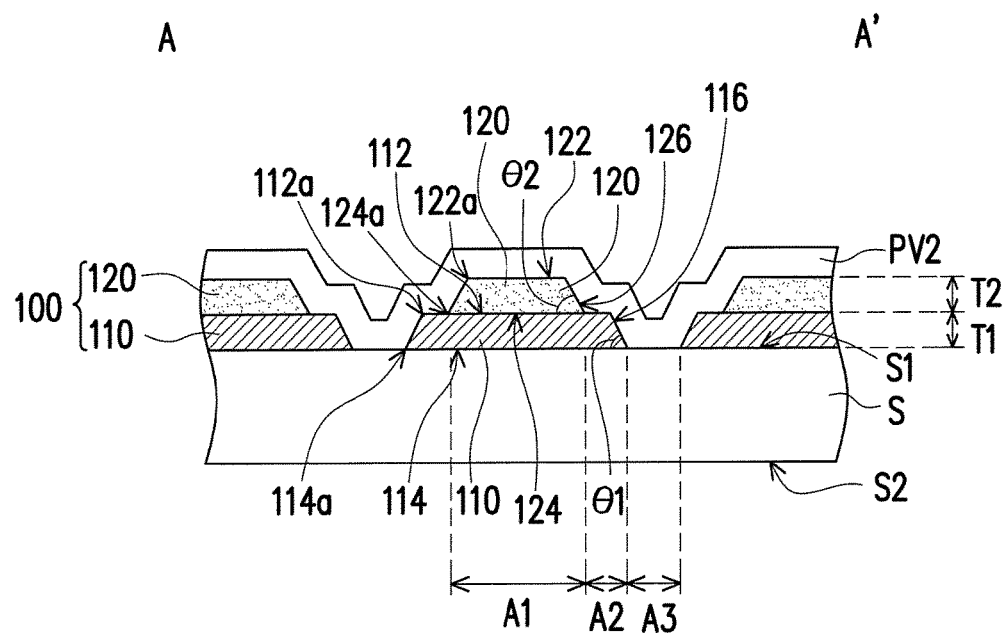
FIG. 3 is schematic cross-sectional view illustrating the touch electrode layer along the line A-A' depicted in FIG. 2.
Figure 4:
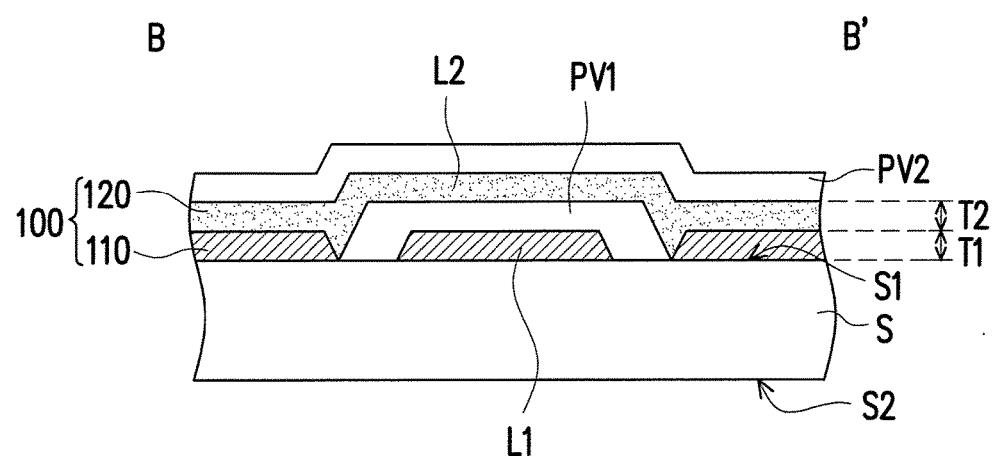
FIG. 4 is schematic cross-sectional view illustrating the touch electrode layer along the line B-B' depicted in FIG. 2.

FIG. 1 is a schematic top view illustrating a touch electrode layer according to an embodiment of the invention. FIG. 2 is an enlarged schematic view illustrating a region R1 of the touch electrode layer depicted in FIG. 1. FIG. 3 is schematic cross-sectional view illustrating the touch electrode layer along the line A-A' depicted in FIG. 2. FIG. 4 is schematic cross-sectional view illustrating the touch electrode layer along the line B-B' depicted in FIG. 2. Please refer to FIG. 1 to FIG. 4 in correspondence with descriptions regarding a touch electrode layer 1000 in the following.

With reference to FIG. 1 and FIG. 2, a touch electrode layer 1000 includes a plurality of touch electrodes 100, a plurality of first bridges L1 (a first bridge L1 indicated in FIG. 2 is taken as an example), a plurality of second bridges L2 (a second bridge L2 indicated in FIG. 2 is taken as an example), and an insulation layer PV1 (indicated in FIG. 2). The touch electrodes 100 are arranged in rows and columns to form an array. The first bridges L1 electrically connect the touch electrodes 100 which are located in the same row to form a plurality of first touch series Sy (a first touch series Sy is taken as an example). The second bridges L2 electrically connect the touch electrodes 100 which are located in the same column to form a plurality of second touch series Sx (a second touch series Sx is taken as an example). The insulation layer PV1 is disposed between the first bridges L1 and the second bridges L2, such that the first touch series Sy and the second touch series Sx are not electrically contacted with each other. It should be noted that although FIG. 1 and FIG. 2 illustrate four of the touch electrodes 100, one of the first bridges L1, one of the second bridges L2, one of the first touch series Sy and one of the second touch series Sx as an example, those of ordinary skills in the art are able to understand the entire structure of the touch electrode layer 1000 according to FIG. 1 and FIG. 2. Thus, the touch electrode layer 1000 which includes the first touch series Sy and the second touch series Sx are not completely demonstrated again herein.

With reference to FIG. 2, FIG. 3 and FIG. 4, the first touch series Sy and the second touch series Sx are disposed on a substrate S (indicated in FIG. 3 and FIG. 4) to form a touch panel (e.g., a capacitance touch panel). As shown in FIG. 3 and FIG. 4, in the present embodiment, the first touch series Sy and the second touch series Sx may be selectively disposed on the same surface S1 of the same substrate S. However, the invention is not limited thereto, as the first touch series Sy and the second touch series Sx may also be disposed in other suitable manners. For example, in another embodiment, the first touch series Sy and the second touch series Sx may also be disposed on a top and bottom surfaces S1 and S2 of the same substrate S, respectively, and the insulation layer PV1 is omitted. In yet another embodiment, the first touch series Sy and the second touch series Sx may also be disposed on two different substrates, respectively, and then these two substrates are assembled to further form a touch panel.

With reference to FIG. 1, in the present embodiment, the touch electrode layer 1000 may selectively include a plurality of dummy electrodes DM. The dummy electrodes DM are disposed in gaps between the first touch series Sy and the second touch series Sx, such that transmittance around the touch electrode layer 1000 is more consistent, and further enhancing visual effects of a touch panel which is provided with the touch electrode layer 1000. The dummy electrodes DM may be floating, but the invention is not limited herein. With reference to FIG. 3 and FIG. 4, the touch electrode layer 1000 of the present embodiment may selectively include an insulation layer PV2. The insulation layer PV2 covers the touch electrodes 100, the first bridges L1, the second bridges L2, and the insulation layer PV1. The insulation layer PV2 is capable of reducing possibilities of contacting moisture with the touch electrodes 100, the first bridges L1 and the second bridges L2, and further increasing reliability of the touch electrode layer 1000. It should be noted that the invention does not limit to whether the touch electrode layer has to include the dummy electrodes and/or the insulation layer PV2. In other embodiments, the touch electrode layer may also not include the dummy electrodes DM and/or the insulation layer PV2.

With reference to FIG. 2, in the present embodiment, the first bridges L1 and a bottom electrode pattern 110 of each touch electrode 100 of the first touch series Sy may be at the same film. In other words, the first bridges L1 and the bottom electrode pattern 110 of each touch electrode 100 of the first touch series Sy may be fabricated together at the same fabricating process. In the present embodiment, the second bridges L2 and a top electrode pattern 120 of each touch electrode 100 of the second touch series Sx may be at the same film. In other words, the second bridges L2 and the top electrode pattern 120 of each touch electrode 100 of the second touch series Sx may be fabricated together at the same fabricating process. In the present embodiment, the insulation layer PV1 includes a plurality of island patterns which are separated from each other (an island pattern is illustrated in FIG. 2 as an example). Each of the island patterns are disposed between one of the first bridges L1 and one of the second bridge L2 which correspond to each other.

It should be noted that a film relation of the first bridge L1 and the bottom electrode pattern 110 of the touch electrode 100, a film relation of the second bridge L2 and the top electrode pattern 120 of the touch electrode 100, and a form of the insulation layer PV1 are merely adopted as examples to illustrate the invention, rather than limiting the invention. A film relation of a first bridge and a bottom electrode pattern of a touch electrode, a film relation of a second bridge and an top electrode pattern of the touch electrode, and a form of an insulation layer have other varieties of possible implementations, which may be selectively applied by those of ordinary skills in the art based on practical needs.

In the present embodiment, the bottom electrode pattern 110 and the top electrode pattern 120 may be fabricated by adopting transparent conductive materials. The transparent conductive materials may be indium tin oxide (ITO), indium zinc oxide (IZO), aluminum tin oxide (ATO), aluminum zinc oxide (AZO), indium germanium zinc oxide (IGZO), a stacked layer of at least two of the above, or other suitable materials. However, the invention is not limited thereto. When a pattern design including a plurality of micro-transparent meshes is adopted for a top electrode pattern and/or a bottom electrode pattern, non-transparent conductive materials, such as metal and the like, may also be selectively adopted for fabricating the top electrode pattern and/or the bottom electrode pattern. In the present embodiment, materials of the insulation layers PV1 and PV2 may be inorganic materials (e.g., silicon oxide, silicone nitride, SiON, or a stacked layer of at least two of the above), organic materials, a stack structure thereof, or a combination thereof With reference to FIG. 2, FIG. 3 and FIG. 4, each of the touch electrodes 100 includes the bottom electrode pattern 110 and the top electrode pattern 120. The top electrode pattern 120 is stacked on the bottom electrode pattern 110, and electrically connected to the bottom electrode pattern 110. In the present embodiment, the bottom electrode pattern 110 and the top electrode pattern 120 may be in direct contact, but the invention is not limited thereto. In other embodiments, other film may also be disposed between the bottom electrode pattern 110 and the top electrode pattern 120. With reference to FIG. 3 and FIG. 4, in the present embodiment, a thickness T1 of the bottom electrode pattern 110 is substantially the same as a thickness T2 of the top electrode pattern 120. However, the invention is not limited thereto. In other embodiments, the thickness T1 of the bottom electrode pattern 110 may also be thicker than the thickness T2 of the top electrode pattern 120, or the thickness T2 of the top electrode pattern 120 may also be thicker than the thickness T1 of the bottom electrode pattern 110. In the present embodiment, the top electrode pattern 120 and the bottom electrode pattern 110 may have a linear outer profile, respectively. To be more specific, within an area range of a unit region (e.g., a region R1), the outer profiles of the top electrode pattern 120 and the bottom electrode pattern 110 may be in a linear shape without notches, but the invention is not limited thereto.

With reference to FIG. 3, the top electrode pattern 120 has a top surface 122 away from the bottom electrode pattern 110, a bottom surface 124 facing the bottom electrode pattern 110, and a side surface 126 which connects between the top surface 122 and the bottom surface 124. The bottom electrode pattern 110 has a top surface 112 facing the top electrode pattern 120, a bottom surface 114 away from the top electrode pattern 120, and a side surface 116 which connects between the top surface 112 and the bottom surface 114. In the present embodiment, the top surface 122 of the top electrode pattern 120, the bottom surface 124 of the top electrode pattern 120, the top surface 112 of the bottom electrode pattern 110, and the bottom surface 114 of the bottom electrode pattern 110 may be parallel to each other, while the side surface 126 of the top electrode pattern 120 and the side surface 116 of the bottom electrode pattern 110 may be tilted with respect to the top surface 122. More specifically, a tape angle θ2 of the top electrode pattern 120 (i.e., an included angle between the bottom surface 124 and the side surface 126) and a tape angle θ1 of the bottom electrode pattern 110 (i.e., an included angle between the bottom surface 114 and the side surface 116) may be selectively the same, but the invention is not limited thereto. In other embodiments, the tape angle θ2 of the top electrode pattern 120 and the tape angle θ1 of the bottom electrode pattern may also be different. In the present embodiment, the tape angle θ2 of the top electrode pattern 120 may be 20 to 80 degrees, and the tape angle θ1 of the bottom electrode pattern 110 may be 20 to 80 degrees. However, the invention is not limited thereto.

With reference to FIG. 2 and FIG. 3, it is worth to note that, in each of the touch electrode 100, normal projections in a XY plane (e.g., a plane perpendicular to a paper surface of FIG. 2 and a paper surface of FIG. 3) of an edge 122a of the top surface 122 of the top electrode pattern 120 (i.e., a border of the top surface 122 and the side surface 126) and an edge 112a of the top surface 112 of the bottom electrode pattern 110 (i.e., a border of the top surface 112 and the side surface 116) are not completely overlapped. In the present embodiment, the edge 122a of the top surface 122 and the edge 124a (indicated in FIG. 3 as a border of the bottom surface 124 and the side surface 126) of the bottom surface 124 of the top electrode pattern 120 are pulled-back from the edge 112a of the top surface 112 and the edge 114a (indicated in FIG. 3 as a border of the bottom surface 114 and the side surface 116) of the bottom surface 114 of the bottom electrode pattern 110. More specifically, the edge 122a of the top surface 122 of the top electrode pattern 120 may be completely located within the edge 112a of the top surface 112 of the bottom electrode pattern 110. That is, the perimeter projection of the edge 122a may be completely located within that of the edge 112a. In other words, the edge 122a is pulled back from the edge 112a, and the edge 122a of the top surface 122 of the top electrode pattern 120 and the edge 112a of the top surface 112 of the bottom electrode pattern 110 may not be completely overlapped. For example, the normal projection in the XY plane of the edge 122a of the top surface 122 of the top electrode pattern 120 and the normal projection in the XY plane of the edge 112a of the top surface 112 of the bottom electrode pattern 110 differ with a distance K1 (indicated in FIGS. 2), and K1 ranges from 5 to 150 microns (μ), but the invention id not limited thereto.

With reference to FIG. 3, in the present embodiment, the top electrode pattern 120 exposes parts of the top surface 112 of the bottom electrode pattern 110, and the side surface 116 of the bottom electrode pattern 110, the parts of the top surface 112 of the bottom electrode pattern 110 exposed by the top electrode pattern 120, the side surface 126 of the top electrode pattern 120, and the top surface 122 of the top electrode pattern 120 may be connected to form a stair surface. However, the present invention is not limited thereto. In other embodiments, the bottom surface 124 of the top electrode pattern 120 may also coincide exactly with the top surface 112 of the bottom electrode pattern 110. In other words, the bottom surface 124 of the top electrode pattern 120 may completely cover the top surface 112 of the bottom electrode pattern 110 and completely expose the side surface 116 of the bottom electrode pattern 110, and the side surface 116 of the bottom electrode pattern 110 and the side surface 126 of the top electrode pattern 120 may directly be connected to form an inclined plane.

It is worth to note that, with a design that "each of the touch electrodes 100 includes the bottom electrode pattern 110 and the top electrode pattern 120 overlapped with each other", impedance of each of the touch electrodes 100 can be lowered, and further reducing loading of a touch panel which has the touch electrodes 100 and enhancing performance of the touch panel. More importantly, the touch panel having the touch electrodes 100 may further provide excellent visual effects by adopting the design that "each of the touch electrodes 100 includes the bottom electrode pattern 110 and the top electrode pattern 120 overlapped with each other" to reduce the loading and at the same time by adopting a design that "the normal projections in the XY plane of the edge 122a of the top surface 122 of the top electrode pattern 120 and an edge 112a of the top surface 112 of the bottom electrode pattern 110 are not completely overlapped".

In particular, as shown in FIG. 3, the touch panel which is provided with the touch electrode layer 1000 may be divided into a plurality of areas A1, A2, and A3 with the design that "the normal projection in the XY plane of the edge 122a of the top surface 122 of the top electrode pattern 120 and the normal projection in the XY plane of the edge 112a of the top surface 112 of the bottom electrode pattern 110 (e.g., a plane perpendicular to a paper surface of FIG. 3) are not completely overlapped". In the area A1, the bottom electrode pattern 110 overlaps with the top electrode pattern 120. In the area A2, the bottom electrode pattern 110 is exposed by the corresponding top electrode pattern 120. In the area A3, the substrate S is exposed by both the top electrode pattern 120 and the bottom electrode pattern 110. The transmittance of the touch panel which is provided with the touch electrode 1000 may vary from a highest transmittance of the area A3 to an intermediate transmittance of the area A2, and then to a lowest transmittance of the area A1. In other words, the transmittance of the touch panel which is provided with the touch electrode layer 1000 varies gradually rather than rapidly with the design that "the normal projection in the XY plane of the edge 122a of the top surface 122 of the top electrode pattern 120 and the normal projection in the XY plane of the edge 112a of the top surface 112 of the bottom electrode pattern 110 are not completely overlapped". In this way, it is not easy for a user to become aware of an outer profile of the touch electrode 100, and thereby, the visual effects of the touch panel which is employed with the touch electrode layer 1000 may be enhanced.

Figure 5:
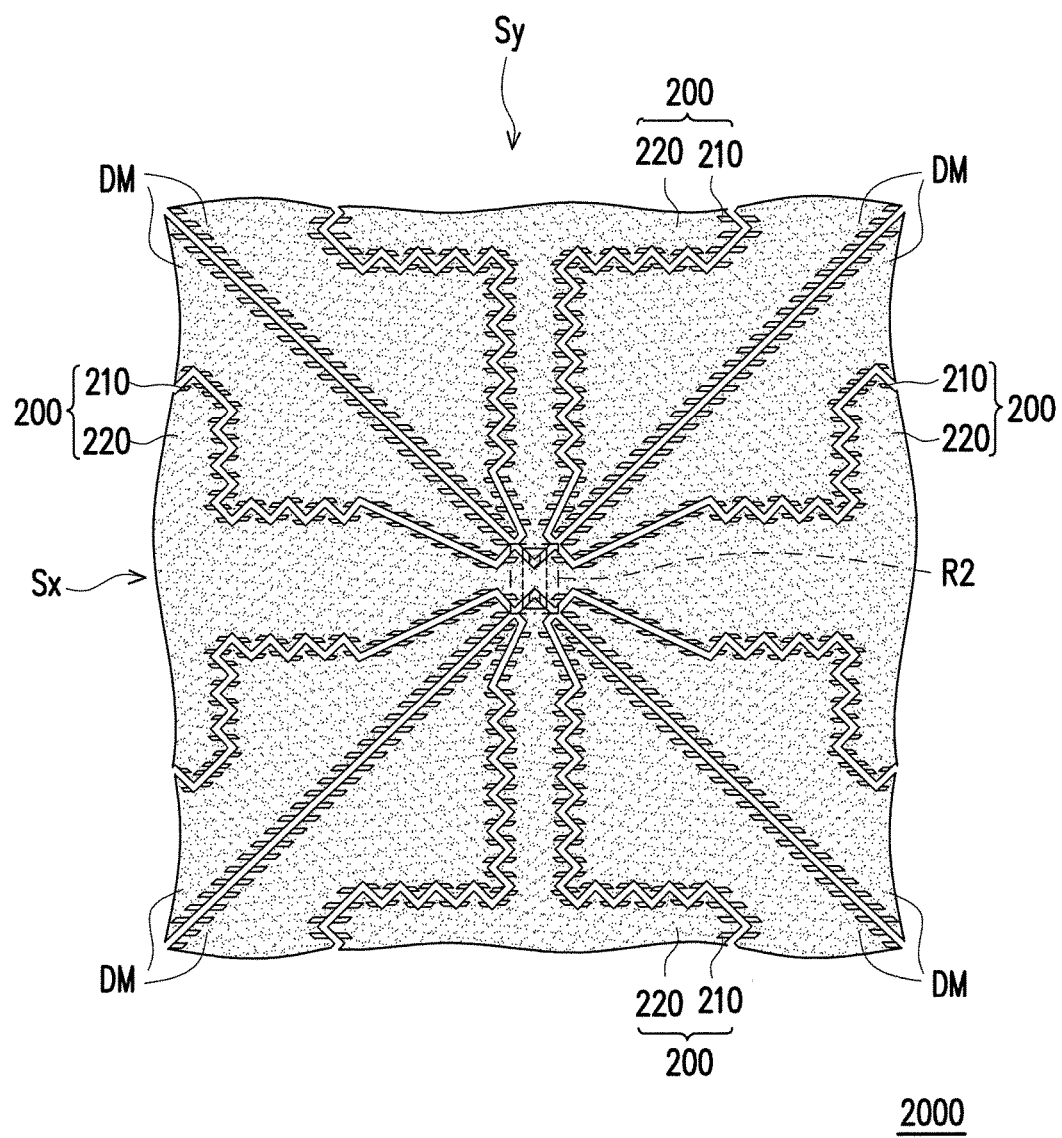
FIG. 5 is a schematic top view illustrating a touch electrode layer according to another embodiment of the invention.
Figure 6:
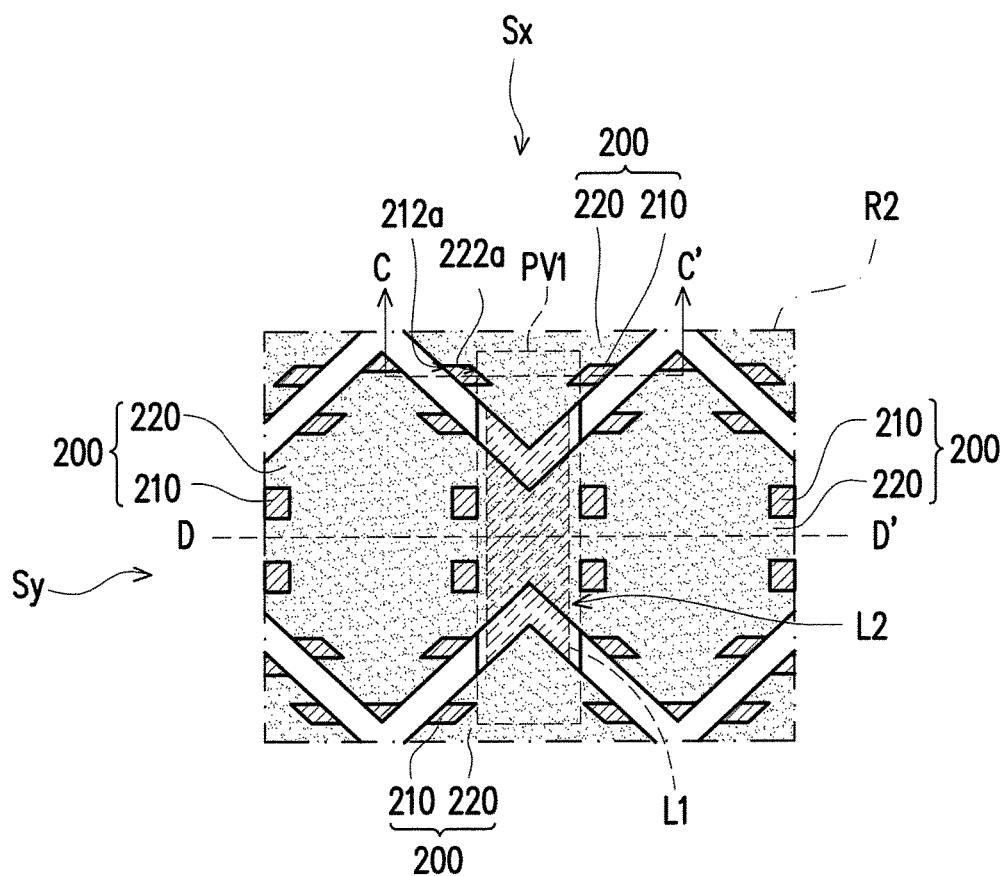
FIG. 6 is an enlarged schematic view illustrating a region R2 of the touch electrode layer depicted in FIG. 5.
Figure 7:
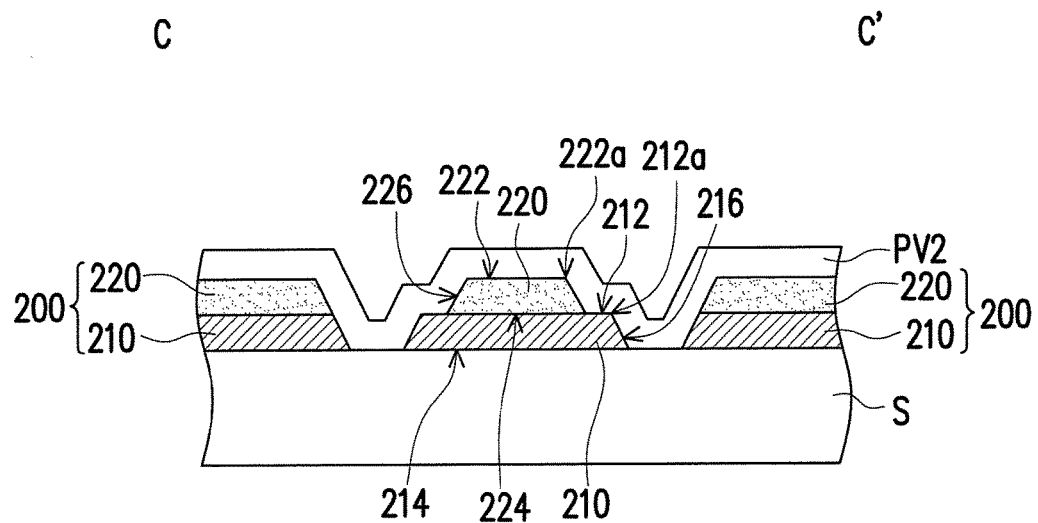
FIG. 7 is schematic cross-sectional view illustrating the touch electrode layer along the line C-C' depicted in FIG. 6.
Figure 8:
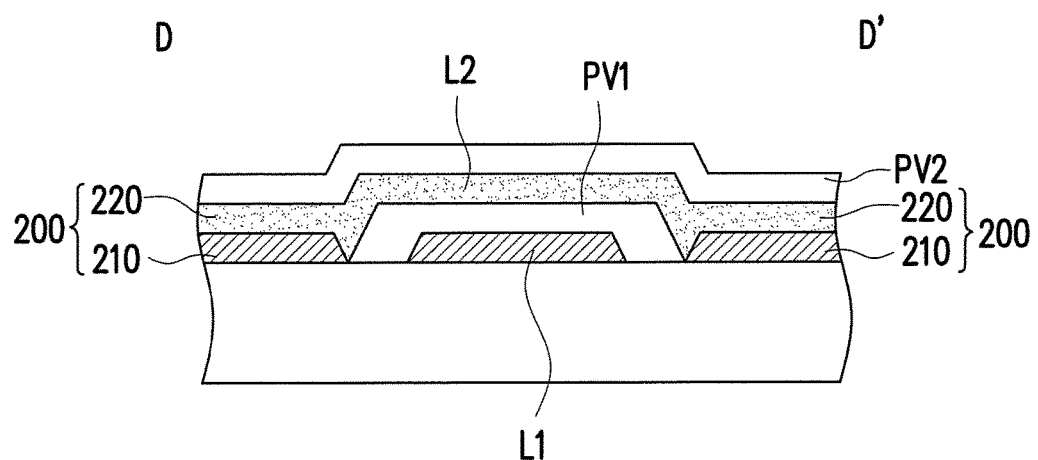
FIG. 8 is schematic cross-sectional view illustrating the touch electrode layer along the line D-D' depicted in FIG. 6.

FIG. 5 is a schematic top view illustrating a touch electrode layer according to another embodiment of the invention. FIG. 6 is an enlarged schematic view illustrating a region R2 of the touch electrode layer depicted in FIG. 5. FIG. 7 is schematic cross-sectional view illustrating the touch electrode layer along the line C-C' depicted in FIG. 6. FIG. 8 is schematic cross-sectional view illustrating the touch electrode layer along the line D-D' depicted in FIG. 6. Please refer to related drawings as shown in FIG. 5 to FIG. 8 in correspondence with illustrations regarding to a touch electrode layer 2000 in the following.

With reference to FIG. 5 and FIG. 6, the touch electrode layer 2000 includes a plurality of touch electrodes 200, the first bridges L1 (the first bridge L1 indicated in FIG. 6 is taken as an example), the second bridges L2 (the second bridge L2 indicated in FIG. 6 is taken as an example), and the insulation layer PV1. The touch electrodes 200 are arranged in rows and columns to form an array. The first bridges L1 electrically connect the touch electrodes 200 which are located in the same row to form the first touch series Sy (the first touch series Sy is taken as an example). The second bridges L2 electrically connect the touch electrodes 200 which are located in the same column to form the second touch series Sx (the second touch series Sx is taken as an example). The insulation layer PV1 is disposed between the first bridges L1 and the second bridges L2, such that the first touch series Sy and the second touch series Sx are not electrically contacted with each other. It should be noted that although FIG. 5 and FIG. 6 illustrate four of the touch electrodes 200, one of the first bridges L1, one of the second bridges L2, one of the first touch series Sy and one of the second touch series Sx as an example, those of ordinary skills in the art are able to understand an entire structure of the touch electrode layer 2000 according to FIG. 5 and FIG. 6. Thus, the touch electrode layer 2000 which includes the first touch series Sy and the second touch series Sx are not completely demonstrated again herein.

With reference to FIG. 5, in the present embodiment, the touch electrode layer 2000 may selectively include the dummy electrodes DM. The dummy electrodes DM are disposed in gaps between the first touch series Sy and the second touch series Sx, such that transmittance around the touch electrode layer 2000 is more consistent. With reference to FIG. 7 and FIG. 8, the touch electrode layer 2000 of the present embodiment may further include the insulation layer PV2. The insulation layer PV2 covers the touch electrodes 200, the first bridges L1, the second bridges L2, and the insulation layer PV1. The insulation layer PV2 is capable of reducing possibilities of contacting moisture with the touch electrodes 200, the first bridges L1 and the second bridges L2, and further increasing reliability of the touch electrode layer 2000. It should be noted that the invention does not limit to whether the touch electrode layer has to include the dummy electrodes DM and/or the insulation layer PV2. In other embodiments, the touch electrode layer may also selectively exclude the dummy electrodes DM and/or the insulation layer PV2.

With reference to FIG. 6 and FIG. 7, each of the touch electrodes 200 includes a bottom electrode pattern 210 and a top electrode pattern 220. The top electrode pattern 220 is stacked on the bottom electrode pattern 210, and electrically connected to the bottom electrode pattern 210. With reference to FIG. 7, the top electrode pattern 220 has a top surface 222 facing away from the bottom electrode pattern 210, a bottom surface 224 facing toward the bottom electrode pattern 210, and a side surface 226 which connects between the top surface 222 and the bottom surface 224. The bottom electrode pattern 210 has a top surface 212 facing toward the top electrode pattern 220, a bottom surface 214 facing away from the top electrode pattern 220, and a side surface 216 which connects between the top surface 212 and the bottom surface 214. In the present embodiment, the top surface 222 of the top electrode pattern 220, the bottom surface 224 of the top electrode pattern 220, the top surface 212 of the bottom electrode pattern 210, and the bottom surface 214 of the bottom electrode pattern 210 may be parallel to each other, while the side surface 226 of the top electrode pattern 220 and the side surface 216 of the bottom electrode pattern 210 may be tilted with respect to the top surface 222, but the invention is not limited thereof.

With reference to FIG. 6 and FIG. 7, it is worth to note that, in each of the touch electrodes 200, normal projections in a XY plane (e.g., a plane perpendicular to a paper surface of FIG. 6 and a paper surface of FIG. 7) of an edge 222a of the top surface 222 of the top electrode pattern 220 (i.e., a border of the top surface 222 and the side surface 226) and an edge 212a of the top surface 212 of the bottom electrode pattern 210 (i.e., a border of the top surface 212 and the side surface 216) are not completely overlapped. What differentiates the touch electrode layer 2000 from the touch electrode layer 1000 lies in that a part of the edge 222a of the top surface 222 of the top electrode pattern 220 may be overlapped with the edge 212a of the top surface 212 of the bottom electrode pattern 210, and the other part of the edge 222a of the top surface 222 of the top electrode pattern 220 may not be overlapped with the edge 212a of the top surface 212 of the bottom electrode pattern 210.

With reference to FIG. 5 and FIG. 6, in the present embodiment, one of the top electrode pattern 220 and the bottom electrode pattern 210 (e.g., the bottom electrode pattern 210) may have a linear outer profile. To be more specific, within the area range of the unit region (e.g., the region R2), the outer profile of one of the top electrode pattern 220 and the bottom electrode pattern 210 (e.g., the outer profile of the bottom electrode pattern 210) may be in a linear shape without notches. The other one of the top electrode pattern 220 and the bottom electrode pattern 210 (e.g., the outer profile of the top electrode pattern 220) may have a non-linear outer profile. To be more specific, within the area range of the unit region (e.g., the region R2), the outer profile of one of the top electrode pattern 220 and the bottom electrode pattern 210 (e.g., the outer profile of the top electrode pattern 220) may be in a non-linear shape without notches. With reference to FIG. 6, in the present embodiment, the non-linear shaped outer profile of the top electrode pattern 220 may be a sawtooth outer profile, a fort-shaped outer profile, a wave-shaped outer profile, or other combinations, but the invention is not limited thereto. In other embodiments, a shape of the outer profile of the top electrode pattern 220 may be in other suitable shapes based on practical needs.

With reference to FIG. 6, in the present embodiment, normal projections in the XY plane (e.g., the paper surface of FIG. 6) of a part of the non-linear outer profile of the top electrode pattern 220 and a part of the linear outer profile of the bottom electrode pattern 210 may be overlapped with each other, and normal projections in the XY plane of another part of the non-linear outer profile of the top electrode pattern 220 and another part of the linear outer profile of the bottom electrode pattern 210 may not be overlapped. In other words, the non-linear outer profile of the top electrode pattern 220 has a plurality of notches. The notches indent from the linear outer profile of the bottom electrode pattern 210 toward an inner part of the top electrode pattern 220. The notches, for example, expose one part of the bottom electrode pattern 210. The notches may selectively be uniformly distributed or randomly distributed. Effects and advantages of the touch electrode layer 2000 are similar to those of the touch electrode layer 1000, and are not reiterated again herein.

Figure 9:
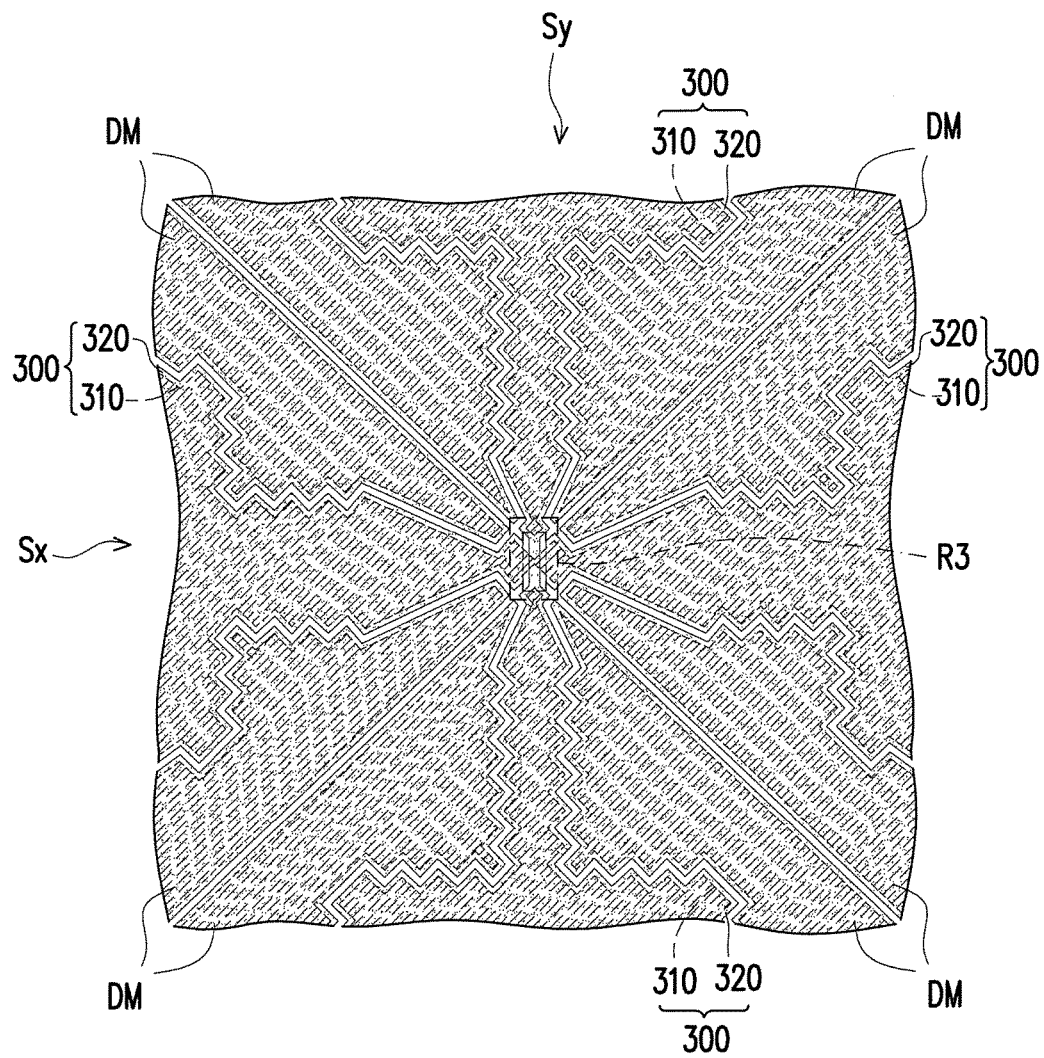
FIG. 9 is a schematic top view illustrating a touch electrode layer according to yet another embodiment of the invention.
Figure 10:
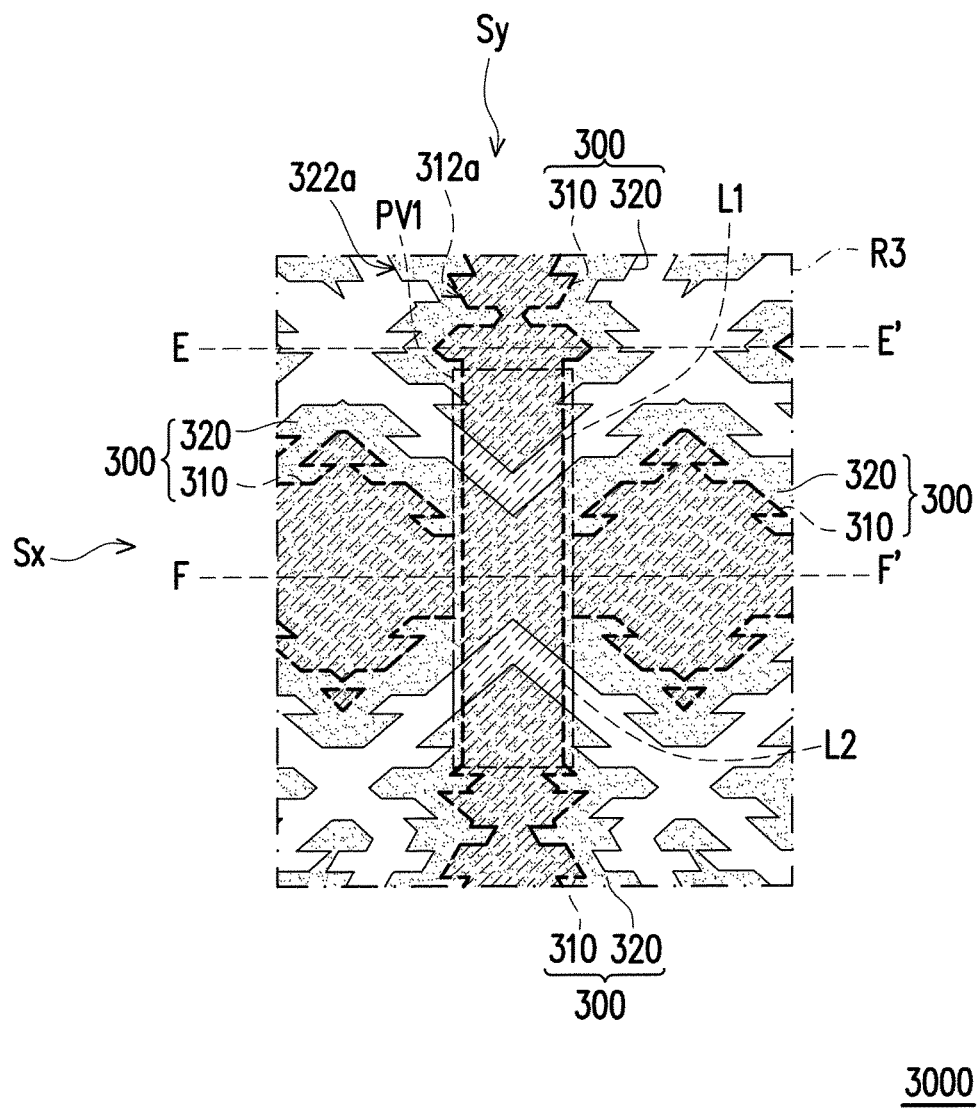
FIG. 10 is an enlarged schematic view illustrating a region R3 of the touch electrode layer depicted in FIG. 9.
Figure 11:
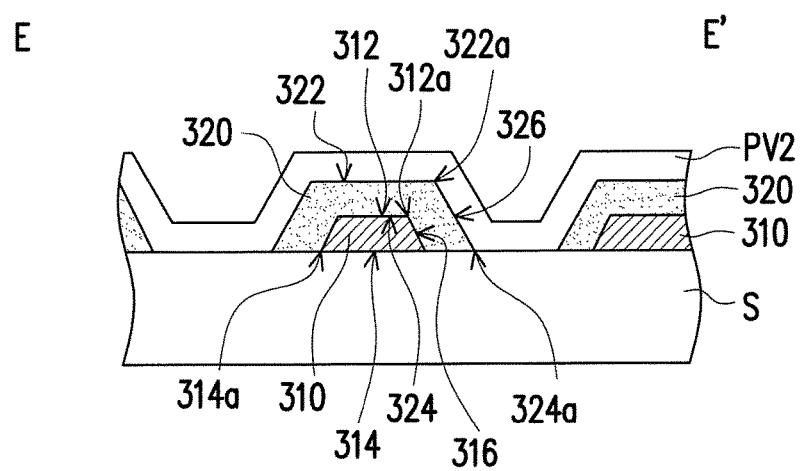
FIG. 11 is schematic cross-sectional view illustrating the touch electrode layer along the line E-E' depicted in FIG. 10.
Figure 12:
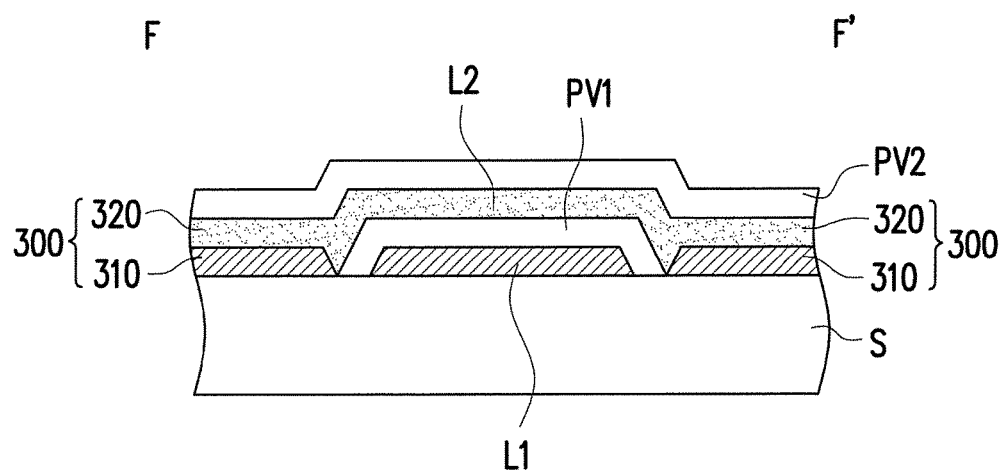
FIG. 12 is schematic cross-sectional view illustrating the touch electrode layer along the line F-F' depicted in FIG. 11.

FIG. 9 is a schematic top view illustrating a touch electrode layer according to yet another embodiment of the invention. FIG. 10 is an enlarged schematic view illustrating a region R3 of the touch electrode layer depicted in FIG. 9. FIG. 11 is schematic cross-sectional view illustrating the touch electrode layer along the line E-E' depicted in FIG. 10. FIG. 12 is schematic cross-sectional view illustrating the touch electrode layer along the line F-F' depicted in FIG. 11. Please refer to related drawings as shown in FIG. 9 to FIG. 12 in correspondence with illustrations regarding to a touch electrode layer 3000 in the following.

With reference to FIG. 9 and FIG. 10, the touch electrode layer 3000 includes a plurality of touch electrodes 300, a plurality of first bridges L1 (a first bridge L1 indicated in FIG. 10 is taken as an example), a plurality of second bridges L2 (a second bridge L2 indicated in FIG. 10 is taken as an example), and an insulation layer PV1 (indicated in FIG. 10). The touch electrodes 300 are arranged in rows and columns to form an array. The first bridges L1 electrically connect the touch electrodes 300 which are located in the same row to form the first touch series Sy (a first touch series Sy is taken as an example). The second bridges L2 electrically connect the touch electrodes 300 which are located in the same column to form the second touch series Sx (a second touch series Sx is taken as an example). The insulation layer PV1 is disposed between the first bridges L1 and the second bridges L2, such that the first touch series Sy and the second touch series Sx are not electrically contacted with each other. It should be noted that although FIG. 9 and FIG. 10 illustrate four of the touch electrodes 300, one of the first bridges L1, one of the second bridges L2, one of the first touch series Sy and one of the second touch series Sx as an example, those of ordinary skills in the art are able to understand an entire structure of the touch electrode layer 3000 according to FIG. 9 and FIG. 10. Thus, the touch electrode layer 3000 which includes the first touch series Sy and the second touch series Sx are not completely demonstrated again herein.

With reference to FIG. 9, in the present embodiment, the touch electrode layer 3000 may selectively include the dummy electrodes DM. The dummy electrodes DM are disposed in gaps between the first touch series Sy and the second touch series Sx, such that transmittance around the touch electrode layer 3000 is more consistent. With reference to FIG. 11 and FIG. 12, the touch electrode layer 3000 of the present embodiment may further include the insulation layer PV2. The insulation layer PV2 covers the touch electrodes 300, the first bridges L1, the second bridges L2, and the insulation layer PV1. The insulation layer PV2 is capable of reducing possibilities of contacting moisture with the touch electrodes 300, the first bridges L1 and the second bridges L2, and further increasing reliability of the touch electrode layer 3000. It should be noted that the invention does not limit to whether the touch electrode layer has to include the dummy electrodes DM and/or the insulation layer PV2. In other embodiments, the touch electrode layer may also selectively exclude the dummy electrodes DM and/or the insulation layer PV2.

With reference to FIG. 10 and FIG. 11, each of the touch electrodes 300 includes a bottom electrode pattern 310 and a top electrode pattern 320. The top electrode pattern 320 is stacked on the bottom electrode pattern 310, and electrically connected to the bottom electrode pattern 310. With reference to FIG. 11, the top electrode pattern 320 has a top surface 322 facing away from the bottom electrode pattern 310, a bottom surface 324 facing toward the bottom electrode pattern 310, and a side surface 326 which connects between the top surface 322 and the bottom surface 324. The bottom electrode pattern 310 has a top surface 312 facing toward the top electrode pattern 320, a bottom surface 314 facing away from the top electrode pattern 320, and a side surface 316 which connects between the top surface 312 and the bottom surface 314. In the present embodiment, the top surface 322 of the top electrode pattern 320, the bottom surface 324 of the top electrode pattern 320, the top surface 312 of the bottom electrode pattern 310, and the bottom surface 314 of the lower electrode pattern 310 may be parallel to each other, while the side surface 326 of the top electrode pattern 320 and the side surface 316 of the bottom electrode pattern 310 may be tilted with respect to the top surface 322, but the invention is not limited thereof.

With reference to FIG. 10 and FIG. 11, it is worth to note that, in each of the touch electrodes 300, normal projections in a XY plane (e.g., a plane perpendicular to a paper surface of FIG. 10 and a paper surface of FIG. 11) of an edge 322a of the top surface 322 of the top electrode pattern 320 (i.e., a border of the top surface 322 and the side surface 326) and an edge 312a of the top surface 312 of the bottom electrode pattern 310 (i.e., a border of the top surface 312 and the side surface 316) are not completely overlapped. A difference between the touch electrode layer 3000 and the touch electrode layer 1000 lies in that, as shown in FIG. 10, both the top electrode pattern 320 and the bottom electrode pattern 310 have non-linear outer profiles. To be more specific, within an area range of a unit region (e.g., region R3), an outer profile of the top electrode pattern 320 and an outer profile of the bottom electrode pattern 310 may be in a non-linear shape with notches. As shown in FIG. 10, the non-linear shaped outer profiles of the top electrode pattern 320 and the bottom electrode pattern 310 may be sawtooth outer profiles, fort-shaped outer profiles, wave-shaped outer profiles, or other combinations thereof, but the invention is not limited thereto. In other embodiments, a shape of the outer profile of the top electrode pattern 320 and a shape of the outer profile of the bottom electrode pattern 310 may be designed to be in other suitable shapes based on practical needs. With reference to FIG. 10, normal projections in a XY plane (e.g., a paper surface of FIG. 10) of the non-linear outer profile of the top electrode pattern 320 and the non-linear outer profile of the bottom electrode pattern 310 may not be completely overlapped. In other words, with reference to FIG. 11, the edge 312a of the top surface 312 and the edge 314a of the bottom surface 314 of the bottom electrode pattern 310 are pulled back from the edge 322a of the top surface 322 and the edge 324a of the bottom surface 324 of the top electrode pattern 320.

Figure 13:
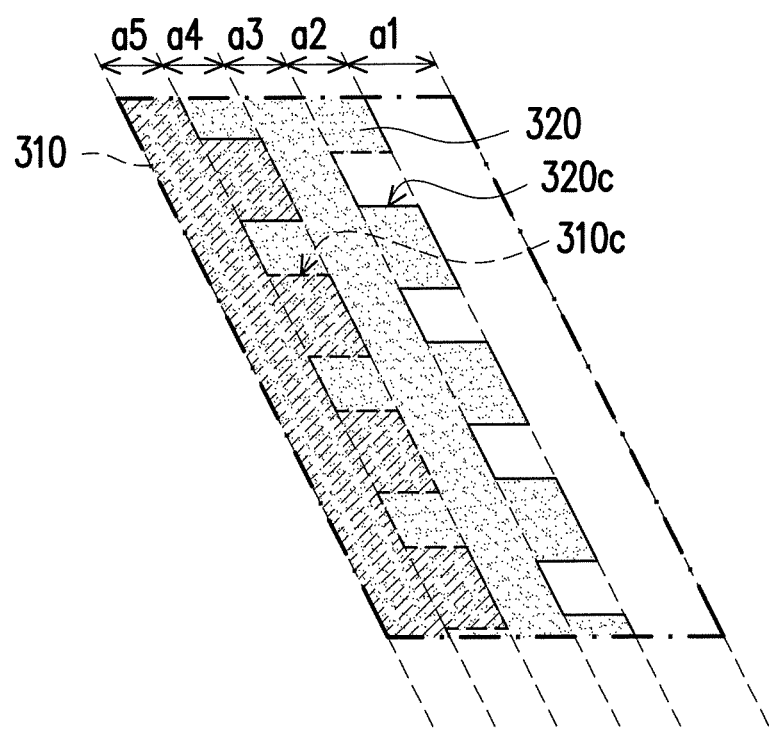
FIG. 13 is a schematic enlarged view illustrating a partial region of FIG. 10.

FIG. 13 is a schematic enlarged view illustrating a partial region depicted in FIG. 10. With reference to FIG. 13, a region a1 is not provided with the top electrode pattern 320 and the bottom electrode pattern 310. The top electrode pattern 320 and the bottom electrode pattern 310 which are stacked together are provided with a fringe region a2, a fringe region a3, a fringe region a4, and a region a5. The fringe region a2 is provided only with the top electrode pattern 320, and the non-linear outer profile of the top electrode pattern 320 is located inside the fringe region a2. In other words, the notches 320c of the top electrode pattern 320 are located in the fringe region a2, and the bottom electrode pattern 310 is not located inside the fringe region a2. The fringe region a3 is provided only with the top electrode pattern 320, and the notches 320c of the top electrode pattern 320 are not located inside the fringe region a3. The fringe region a4 is provided with the top electrode pattern 320 and the bottom electrode pattern 310, and the non-linear outer profile of the bottom electrode pattern 310 is located inside the fringe region a4. In other words, the fringe region a4 is provided with the top electrode pattern 320 and the bottom electrode pattern 310, and notches 310c of the bottom electrode pattern 310 are located inside the fringe region a4, while the notches 320c of the top electrode pattern 320 are not located inside the fringe region a4. The fringe region a5 is provided with the top electrode pattern 320 and the bottom electrode pattern 310, and the notches 310c of the bottom electrode pattern 310 and the notches 320c of the top electrode pattern 320 are not located inside the fringe region a5. From another aspect, a partial outer profile of the top electrode pattern 320 and a partial outer profile of the bottom electrode pattern 310 are completely separated and not overlapped. The partial outer profile of the top electrode pattern 320 has the notches 320c. The partial outer profile of the bottom electrode pattern 310 has the notches 310c. Besides, the notches 320c and the notches 310c are staggered. By adopting the aforesaid design, from the region a1, the fringe regions a2, a3, a4, to the region a5, transmittance of a touch panel provided with the touch electrode layer 3000 varies in a more mild manner in each region, such that it is less easier for a user to perceive edges of the touch electrode 300, and visual effects of the touch panel of the touch electrode layer 3000 is further enhanced.

In view of the above, a touch electrode layer in an embodiment of the invention includes touch electrodes. Each touch electrode includes a bottom electrode pattern and a top electrode pattern stacked with each other. A normal projection in a XY plane of an edge of a top surface of the top electrode pattern and a normal projection in the XY plane of an edge of a top surface of the bottom electrode pattern are not completely overlapped. In other words, a touch panel provided with a touch electrode layer may be divided into a region without the top and bottom electrode patterns, regions provided with one of the bottom electrode pattern and the top electrode pattern and without the other one of the bottom electrode pattern and the top electrode pattern, and regions provided with both the bottom electrode pattern and the top electrode pattern. Transmittance in the regions without the bottom electrode pattern and the top electrode pattern is high. Transmittance in the regions with the bottom electrode pattern and the top electrode pattern and without the other one of the bottom electrode pattern and the top electrode pattern is intermediate. Besides, the regions provided with both the bottom electrode pattern and the top electrode pattern is low. Accordingly, transmittance of the touch panel, from the region without the touch electrodes to the inside of the touch electrodes, is able to vary gradually rather than rapidly. In this way, it is not easy for a user to perceive an outer profile of the touch electrode, and thereby, the visual effects of the touch panel may be enhanced.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A touch electrode layer, comprising:
a plurality of touch electrodes, arranged in a plurality of rows and a plurality of columns to form an array, wherein each of the touch electrodes comprises:
a bottom electrode pattern; and
a top electrode pattern, stacked with and contacting the bottom electrode pattern, wherein a normal projection in a XY plane of an edge of a top surface of the top electrode pattern and a normal projection in the XY plane of an edge of a top surface of the bottom electrode pattern are partially overlapped or are not overlapped;
a plurality of first bridges, electrically connecting the touch electrodes located in the same row to form a plurality of first touch series;
a plurality of second bridges, electrically connecting the touch electrodes located in the same columns to form a plurality of second touch series; and
an insulation layer, disposed between one of the first bridges and one of the second bridges, wherein a normal projection in a XY plane of an edge of a top surface of the top electrode pattern and a normal projection in the XY plane of an edge of a top surface of the bottom electrode pattern are partially overlapped or are not overlapped at an area far away from the insulation layer,
wherein the normal projection in the XY plane of the edge of the top surface of the top electrode pattern and the normal projection in the XY plane of the edge of the top surface of the bottom electrode pattern differ from 5 to 150 microns.

2. The touch electrode layer as claimed in claim 1, wherein one of the top electrode pattern and the bottom electrode pattern has a linear outer profile, and the other one has a non-linear outer profile.

3. The touch electrode layer as claimed in claim 2, wherein normal projections in the XY plane of a part of the non-linear outer profile and a part of the linear outer profile are overlapped with each other, and normal projections in the XY plane of another part of the non-linear outer profile and another part of the linear outer profile are not overlapped.

4. The touch electrode layer as claimed in claim 3, wherein the non-linear outer profile comprises a wave-shaped outer profile or a sawtooth outer profile.

5. The touch electrode layer as claimed in claim 2, wherein normal projections in the XY plane of the non-linear outer profile and the linear outer profile are completely not overlapped.

6. The touch electrode layer as claimed in claim 1, wherein the top electrode pattern and the bottom electrode pattern have a non-linear outer profile, respectively.

7. The touch electrode layer as claimed in claim 6, wherein the non-linear outer profile comprises a fort-shaped outer profile, a wave-shaped outer profile or a sawtooth outer profile.

8. The touch electrode layer as claimed in claim 6, wherein normal projections in the XY plane of the non-linear outer profile of the top electrode pattern and the non-linear outer profile of the bottom electrode pattern are partially not overlapped.

9. The touch electrode layer as claimed in claim 6, wherein normal projections in the XY plane of the non-linear outer profile of the top electrode pattern and the non-linear outer profile of the bottom electrode pattern are completely not overlapped.

10. The touch electrode layer as claimed in claim 1, wherein the top electrode pattern and the bottom electrode pattern comprise a transparent conductive material, and thicknesses of the top electrode pattern and the bottom electrode pattern are substantially the same.

11. The touch electrode layer as claimed in claim 1, wherein the edge of the top surface and an edge of a bottom surface of the top electrode pattern are pulled-back from the edge of the top surface and an edge of a bottom surface of the bottom electrode pattern.

12. The touch electrode layer as claimed in claim 1, wherein the edge of the top surface and an edge of a bottom surface of the bottom electrode pattern are pulled-back from the edge of the top surface and an edge of a bottom surface of the top electrode pattern.

13. The touch electrode layer as claimed in claim 1, wherein a tape angle of the top electrode pattern ranges from 20 to 80 degrees, and a tape angle of the bottom electrode pattern ranges from 20 to 80 degrees so that transmittance varies from a highest transmittance of an area outside the each of the touch electrodes to an intermediate transmittance of an area overlapping the bottom electrode pattern and then to a lowest transmittance of an area overlapping both of the bottom electrode pattern and the top electrode pattern.

14. The touch electrode layer as claimed in claim 1, wherein the top electrode pattern and the bottom electrode pattern have a linear outer profile, respectively.

15. The touch electrode layer as claimed in claim 1, wherein the top electrode pattern and the bottom electrode pattern comprise a transparent conductive material, and a thickness of the top electrode pattern and a thickness of the bottom electrode pattern are not the same.

16. The touch electrode layer as claimed in claim 1, wherein the insulation layer is not on a slant side surface of the bottom electrode pattern.

* * * * *